United States Patent [19]

Betts

[11] Patent Number: 5,310,303
[45] Date of Patent: May 10, 1994

[54] UNDERSLUNG TRAILER CARGO CONTAINER SYSTEM

[76] Inventor: Gaylord N. Betts, 740 Old Salem Ave., Albany, Oreg. 97321

[21] Appl. No.: 905,034

[22] Filed: Jun. 26, 1992

[51] Int. Cl.⁵ ............................................. B60R 9/00
[52] U.S. Cl. .................. 414/462; 224/42.41; 414/458; 414/498; 414/540
[58] Field of Search .............. 414/540, 541, 544, 498, 414/495, 341, 343, 347, 462, 466, 525.1, 458, 459, 497, 501; 224/42.32, 42.41, 42.43, 42.44, 42.46 R; 296/37.1, 37.6

[56] References Cited

U.S. PATENT DOCUMENTS

| | | | |
|---|---|---|---|
| 586,641 | 7/1897 | Underwood | 414/541 |
| 758,493 | 4/1904 | Abbey | 414/540 X |
| 2,607,518 | 8/1952 | Cohen | 224/42.41 |
| 2,937,879 | 5/1960 | Lion | 414/498 X |
| 3,002,760 | 10/1961 | Lee | 414/498 X |
| 3,204,796 | 9/1965 | Hand | 414/498 |
| 3,240,408 | 3/1966 | Lapansie | 414/498 X |
| 3,305,116 | 2/1967 | McKee | 414/459 |
| 3,788,683 | 1/1974 | Rumell | 414/498 X |
| 4,418,853 | 12/1983 | Shaffer | 224/42.41 |
| 4,564,134 | 1/1986 | Seibert | 224/42.41 |
| 4,743,059 | 5/1988 | Legueu | 414/498 |
| 4,772,063 | 9/1988 | Amy | 296/37.1 |
| 4,878,605 | 11/1989 | Doyle et al. | 224/42.41 |
| 4,890,970 | 1/1990 | Willits | 414/462 |
| 4,948,169 | 8/1990 | Amundson | 224/42.41 X |

FOREIGN PATENT DOCUMENTS 671374  8/1989  Switzerland .................. 414/540

Primary Examiner—David A. Bucci
Attorney, Agent, or Firm—Flehr, Hohbach, Test, Albritton & Herbert

[57] ABSTRACT

An underslung cargo container system in which a cargo container is removably secured to the exterior bottom of the trailer of a truck.

1 Claim, 4 Drawing Sheets

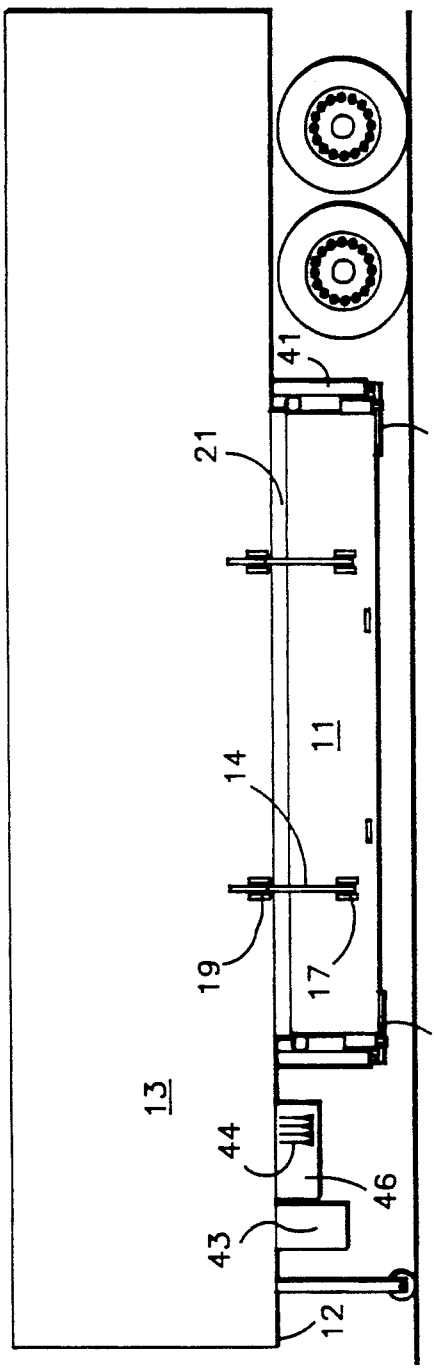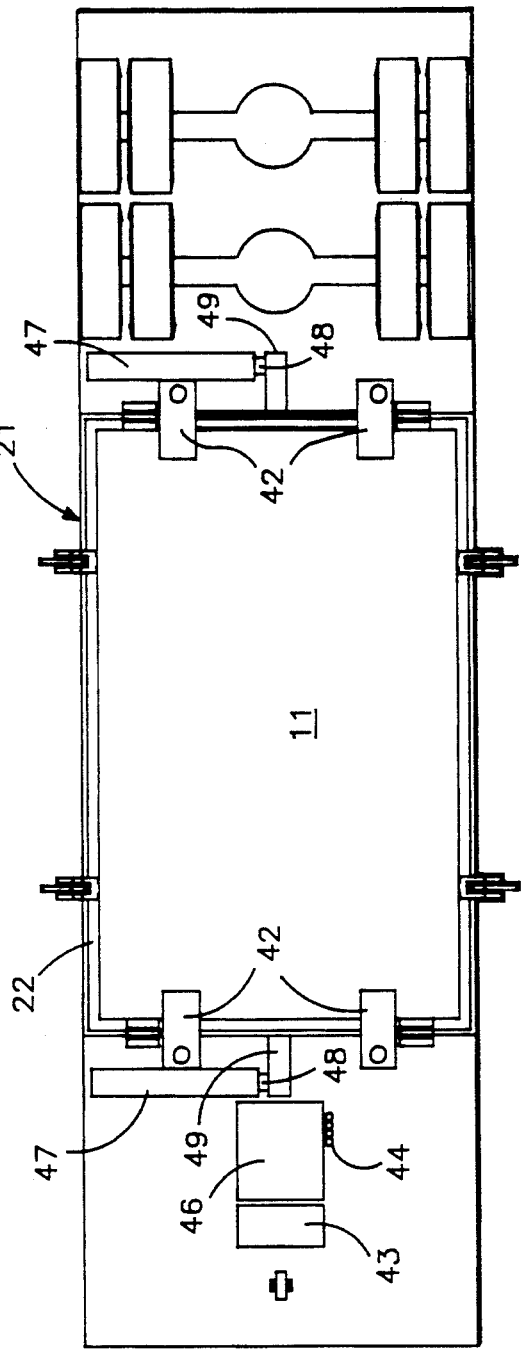

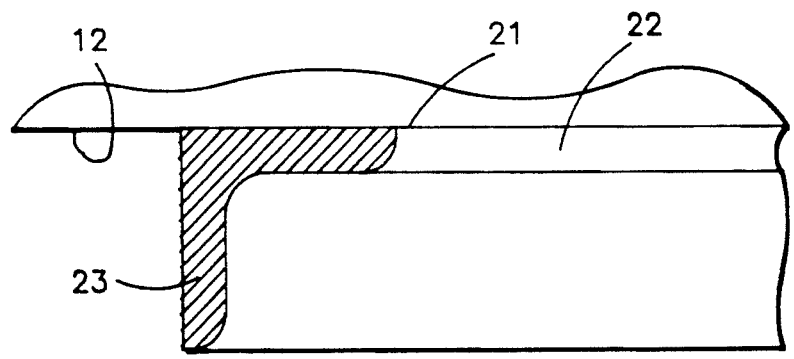
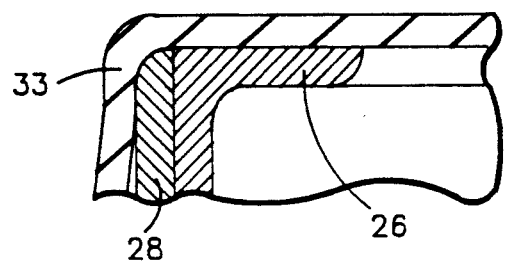
FIG.-5
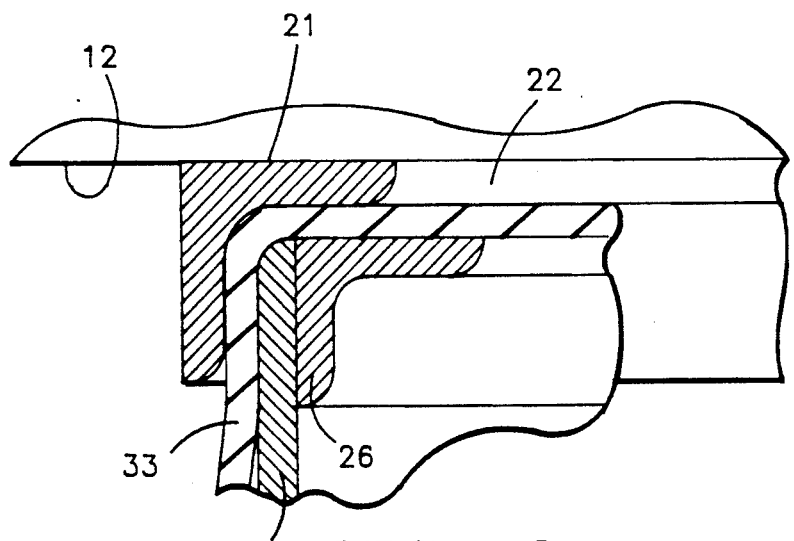
FIG.-6
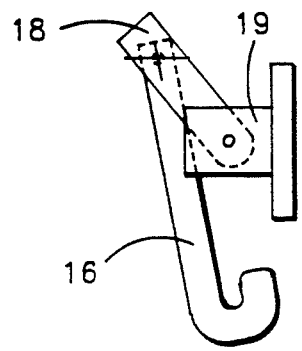
FIG.-7

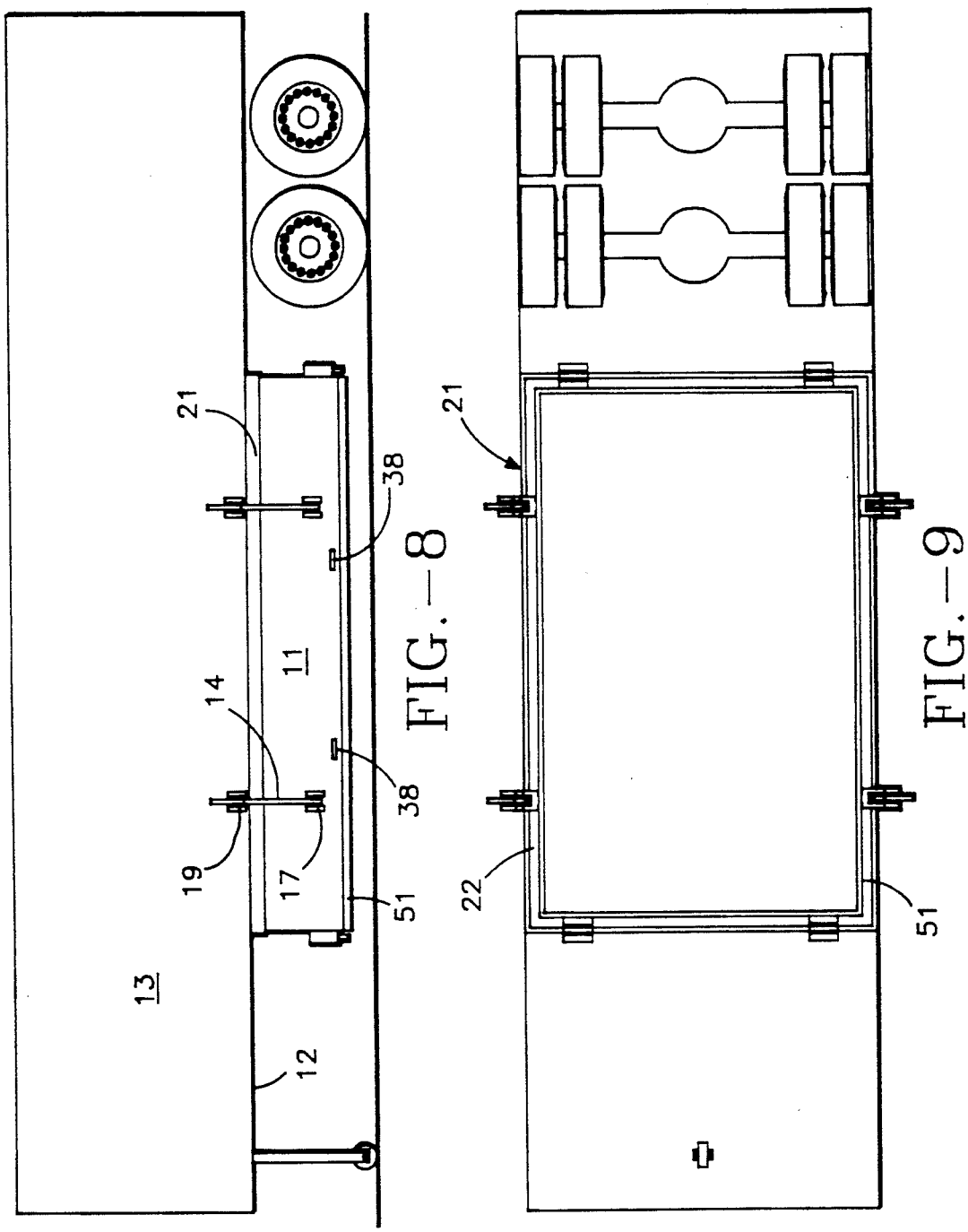

UNDERSLUNG TRAILER CARGO CONTAINER SYSTEM

BRIEF DESCRIPTION OF THE INVENTION

This invention relates generally to an underslung cargo container system, and more particularly to an underslung trailer container system with containers adapted to be removably secured to the under-body of a trailer and moved for loading, unloading and storage.

BACKGROUND OF THE INVENTION

Generally, the space between the lower surface of a trailer between the rear wheels and the forward trailer support is wasted in that it is not utilized to carry cargo. It has been suggested that this space can be used to carry pallets on a return trip. It has also been suggested to provide a frame which receives a container for transporting perishable goods.

Trailers have been built wherein the floor of the trailer is lowered between the rear wheels and the front support to use the wasted space. However, such trailers are inconvenient to load because of the sloping floor.

If the space between the rear wheels and the support is used for carrying cargo, there is a substantial increase in revenue because of the additional cargo which can be transported. Desirable would be a standardized container which can be independently loaded, unloaded, moved, stored, and which can be easily secured to the underside of a trailer between the rear wheels and the front support.

OBJECTS AND SUMMARY OF THE INVENTION

It is an object of this invention to provide a container which can be easily moved, loaded and unloaded, stored, and/or secured to the underside of a trailer.

It is another object of this invention to provide an under-body trailer container system which is easy and convenient to use.

It is another object of this invention to provide an under-body trader container system which is simple and inexpensive in construction.

The foregoing and other objects of the invention are achieved by a container system including a cargo container having retractable wheels for movement of the container into cooperative relationship with the trailer's underside and away from the trailer for loading, unloading and storage, and means on the underside of the trailer for receiving and holding the container into position during transport.

BRIEF DESCRIPTION OF THE DRAWINGS

The foregoing and other objects of the invention will be more clearly understood from the following description when read in conjunction with the accompanying drawings, wherein:

FIG. 1 is a side elevational view of the preferred embodiment of the container system with a cargo container removably secured to the trailer;

FIG. 2 is a bottom view of FIG. 1 showing the trailer underside and guide frame in accordance with the invention;

FIG. 5 is an enlarged view, partly in section, showing the cooperation between the cargo container and the guide frame;

FIG. 6 is an enlarged view showing the cargo container seated in the guide frame;

FIG. 7 is a schematic diagram of a snap-over locking device used in securing the container to the underside of the trailer, FIG. 8 is aside elevational view of another embodiment of the invention; and FIG. 9 is a bottom view of the system of FIG. 8.

DESCRIPTION OF PREFERRED EMBODIMENT

Figure 3:
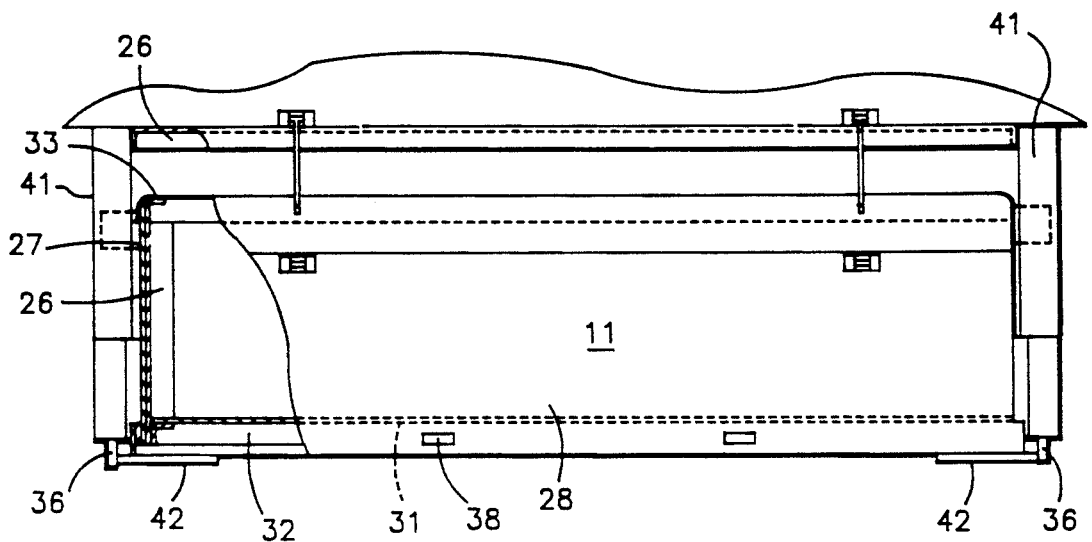
FIG. 3 is a side elevational view of a cargo container in juxtaposition with the trailer underside and guide frame.
Figure 4:
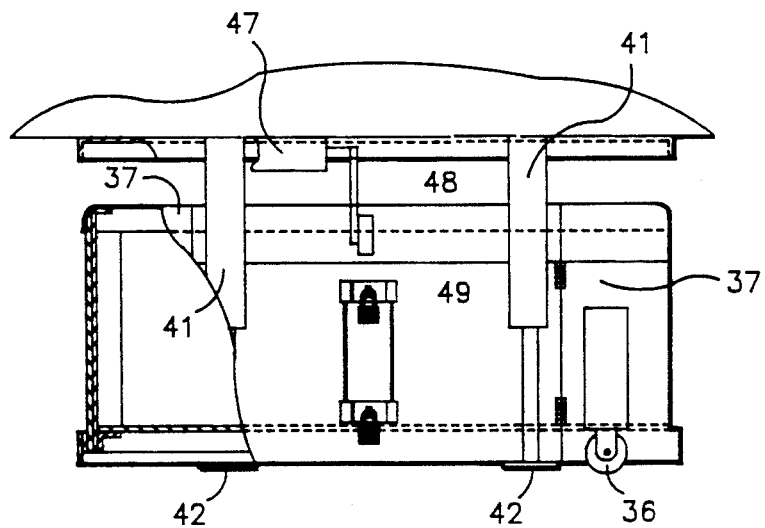
FIG. 4 is a front elevational view of a cargo container in juxtaposition with the underside of a trailer body and guide frame.

FIG. 1 shows a cargo container 11 mounted to the bottom or underside 12 of a trailer 13. The container is secured to the underside of the trailer by snap-over locking devices 14. An example of a suitable locking device is shown in FIG. 7. The device includes an arm 16 with its lower end adapted to engage pins in the container brackets 17. The upper end of the arm is pivotally connected to a handle 18 which has one end removably and pivotally secured to a trailer bracket 19 so that the locking device may be removed when not in use. The rotation of the handle towards the trailer lifts the arm and clamps the container against the underside of the trailer. It is, of course, apparent that other means can be used to releasably secure the container to the underside of the trailer.

In the embodiment shown, the cargo container is held by a rectangular guide or frame 21 which is suitably attached to the underside of the trailer as, for example, by welding. The frame comprises L-shaped members 22 shown in enlarged detail in FIGS. 5 and 6, connected at their ends to form the frame and having one leg secured to the trailer while the other leg 23 extends downwardly to receive and guide the container when it is lifted into place under the trailer as will be presently described.

Referring to FIGS. 2 and 3, the container 11 has a box-like frame structure made up of horizontal and vertical members 26 which may comprise angle iron or box beams affixed at their ends to form the frame. The members may be suitably affixed to one another as by welding to define the outlines of the container. A suitable skin 28 is affixed as by riveting to the upper and side faces of the frame members 26 to cover the ends, top and sides of the frame structure to define the cargo space. A reinforced floor 31 is carried by the lower frame members 32. The top of the container is provided with a flexible cover 33 which has downwardly extending sides. One end of the container is provided with doors 37 which are hingeably secured to the end wall and provide for access to the interior of the compartment for loading and unloading cargo.

Each end of the container is provided a pair of spaced retractable wheels 36. In one embodiment, the wheels may be manually locked in the retracted, or up position as shown in FIG. 1, or they may be released and lowered where then can engage the ground and support the container.

Referring particularly to FIGS. 5 and 6, a corner of the container is shown in cooperative relationship with the guide frame 21. When the container is to be placed in cooperative relationship with the underside of the trailer, the container is moved toward the underside of the trailer and the flexible cover 33 engages the L-shaped bracket 22 and the container is moved into position and sealed to the container under-body. It is then locked in place with the snap-over locking devices 14. the wheels are then retracted. When the container is detached from the trailer, the retracted wheels are lowered adjacent to the ground but leaving a space sufficient for the top of the container to clear the rectangular frame. The container is lowered until the wheels engage the ground; the container can then be moved out from under the trailer.

Referring to the preferred embodiment of the system, FIGS. 1–4, the container is lifted into place and lowered by spaced hydraulic cylinders 41 attached to the underside of the trailer. Four cylinders, two at each end of the container, are used. The cylinder rods include an arm 42. In operation, the cylinder is operated to extend the rod until the arms rest on the ground. The container is then rolled or moved into place under the trailer. The hydraulic cylinders are then activated and the arms engage the underside of the container and the container is lifted into place. A valve control locks the cylinders so that the container is held in place. As a safety measure, the latches 14 are also used to lock the container in place. The hydraulic cylinders may be hinged so that when a container is not being carried, they can be rotated to the underside of the trailer and suitably held by suitable locking means, not shown. To remove the container the latches are released and the hydraulically operated rods are lowered to allow the wheels to engage the ground and further lowered to allow the wheels to ride over the arms for removal of the container.

The hydraulic fluid for operating the system may be pressurized by a battery operated pump contained in the unit 43 and controlled by controller 44. The housing 46 houses the battery. In this manner the container system may be operated independently of the associated truck. A suitable hydraulic system is sold by Milwaukee Cylinders, Beaver Dam, Wis.

It may be desirable to include power-assisted means for initially moving the container away from the trailer. Two hydraulic cylinders 47 may be mounted under the trailer with arms 48 secured to their rods. The arms engage abutments 49 on the ends of the container and move the container part way out from under the trailer where it can be more easily handled.

It is seen that the self-contained, power-assisted system just described makes it very easy for a driver to mount and dismount a cargo container.

In another embodiment, the wheels are attached to a suitable hydraulic lift assembly associated with an independent hydraulic system such as systems sold by Milwaukee Cylinder, or the trailer hydraulic system may be connected to the hydraulic cylinder. In either event, the cylinders then control the positioning of the wheels to engage or disengage from the ground. In this embodiment, the cargo container may be rolled on the wheels into place beneath the trailer and the hydraulic pressure applied to the cylinders, lifting the cargo container into place under the frame for locking engagement by the snap-over devices, at which time the wheels are retracted. In removal, the wheels would be hydraulically lowered to engage the ground; the snap-over devices would be released; the wheels would then be raised a sufficient distance for the top of the container to clear the trailer where the container could then be rolled out from under the trailer to another position or location for loading, unloading or storage.

In a further embodiment, FIGS. 8 and 9, the container may be mounted and dismounted by using a forklift with its tines extending into slots 38. Operation of the wheels and latch are as previously described.

The cargo container may also be provided with a skirt 51 which extends downwardly from the bottom and is adapted to fit over the top of a container whereby containers can be stacked one on top of the other.

It is seen that the cargo container can easily be mounted and dismounted from the trader body without the necessity of manual labor or bolting or unbolting of the container to the trailer underside. The container can be easily moved to various locations on its wheels and into position easily underneath the trailer. In a preferred embodiment, the hydraulically activated cylinders serve the purpose of lifting the container into position for locking to the trailer under-body and for removing the container.

What is claimed:

1. An underslung trailer container system adapted to fit on a trailer underside including
    a cargo container having a top and a bottom;
    means on the trailer underside for receiving and guiding the top of said container to position the container on the underside of the trailer;
    means for lifting the container into engagement with said receiving and guide means, said lifting means including spaced hydraulic cylinders mounted to and extending downwardly from the underside of the trailer, said cylinders including a rod and an arm extending outwardly from said rod, said arms adapted to engage the bottom of the container to lift the container into place under the trailer and to lower the container for removal;
    means for releasably securing the container to the underside of the trailer, and
    an additional pair of hydraulic cylinders mounted underneath the trailer, the rods of said cylinders including means for moving the container laterally after it has been released and lowered.

* * * * *